(12) United States Patent
VanValkenburgh

(10) Patent No.: US 11,794,834 B2
(45) Date of Patent: Oct. 24, 2023

(54) LEVER-ACTUATED LOCK FOR REMOVABLE MOTORCYCLE STAND HANDLE

(71) Applicant: Pit Bull Products, Inc., Huntsville, AL (US)

(72) Inventor: Charles VanValkenburgh, Hunststville, AL (US)

(73) Assignee: Pit Bull Products, Inc., Huntsville, AL (US)

( * ) Notice: Subject to any disclaimer, the term of this patent is extended or adjusted under 35 U.S.C. 154(b) by 330 days.

(21) Appl. No.: 17/333,048

(22) Filed: May 28, 2021

(65) Prior Publication Data
US 2022/0379984 A1    Dec. 1, 2022

(51) Int. Cl.
*B62H 3/10* (2006.01)
*B66F 5/02* (2006.01)

(52) U.S. Cl.
CPC ............... *B62H 3/10* (2013.01); *B66F 5/02* (2013.01)

(58) Field of Classification Search
CPC ... B62H 3/10; B66F 5/02; B66F 15/00; B25H 1/0014
See application file for complete search history.

(56) References Cited

U.S. PATENT DOCUMENTS

| | | | | |
|---|---|---|---|---|
| 5,601,277 A | * | 2/1997 | Larson | B66F 15/00 |
| | | | | 254/131 |
| 5,732,960 A | * | 3/1998 | Elam | B60B 29/002 |
| | | | | 254/113 |
| 6,056,272 A | * | 5/2000 | Sayler | B66F 15/00 |
| | | | | 254/131 |
| 6,488,157 B2 | * | 12/2002 | Chen | B66F 3/005 |
| | | | | 211/20 |
| 6,802,493 B2 | * | 10/2004 | Lance | B66F 3/005 |
| | | | | 254/8 B |
| 9,045,184 B2 | | 6/2015 | ValValkenburgh | |
| 11,001,484 B2 | | 5/2021 | VanValkenburgh | |
| 2004/0124404 A1 | * | 7/2004 | Goldie | B66F 15/00 |
| | | | | 254/94 |
| 2013/0087750 A1 | * | 4/2013 | Pasto | B66F 3/00 |
| | | | | 254/134 |

OTHER PUBLICATIONS

Pit Bill Products, motorcycle stand with removable handle; https://www.pit-bull.com/motorcycle-stands/front-stands/bmw-forklift-front-stand-for-bmw-k-bikes-f0100-400.

* cited by examiner

*Primary Examiner* — Seahee Hong
(74) *Attorney, Agent, or Firm* — Adam K. Sacharoff; Much Shelist, P.C.

(57) ABSTRACT

A system comprising a lever-actuated lock for removable motorcycle stand handle. The motorcycle stand has a removable handle configured to attach to a primary receiver extending outwardly away from a U-shaped stand frame such that when the removable handle is secured to the primary receiver the motorcycle stand is configured to lift an end of a motorcycle off a surface. The lever release mechanism positioned on an end of the removable handle and configured for a single handed release by a user, the lever release mechanism having a locking configuration configured to secure the removable handle component to the primary receiver and having an locking configuration configured to allow for the removable of the removable handle from the primary receiver post.

6 Claims, 7 Drawing Sheets

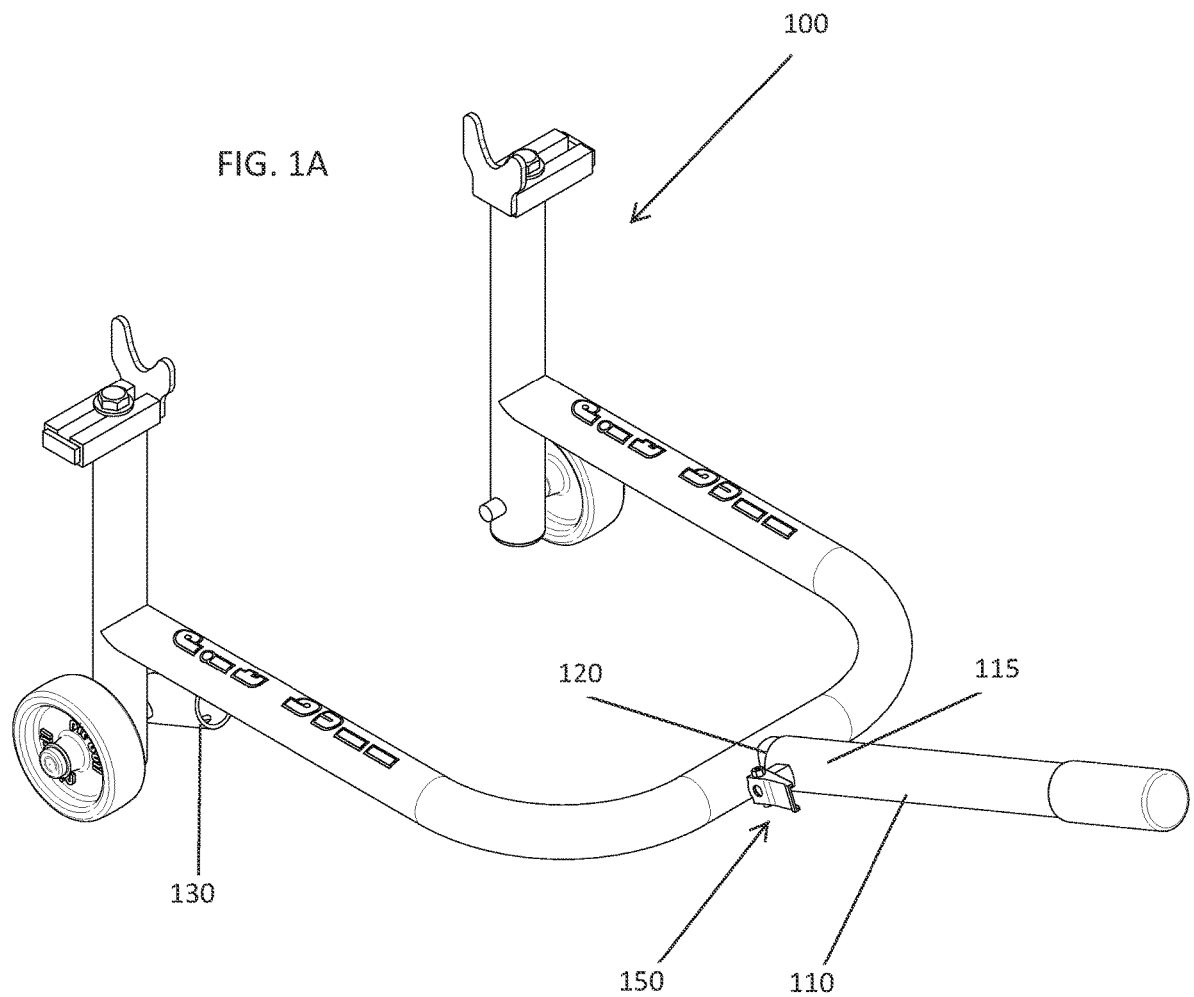

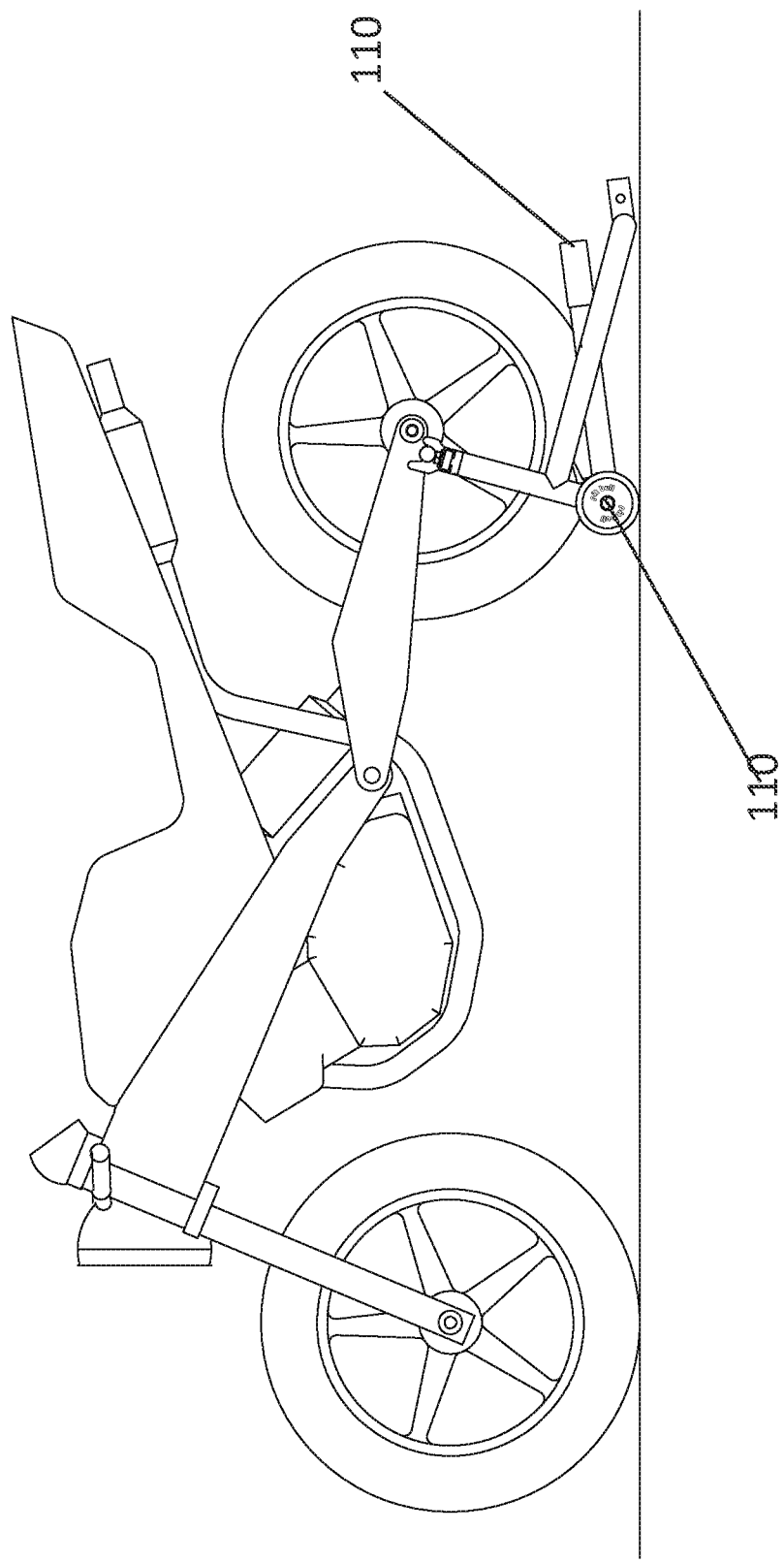

LEVER-ACTUATED LOCK FOR REMOVABLE MOTORCYCLE STAND HANDLE

BACKGROUND OF THE INVENTION

The present invention relates generally to motorcycle stands. More particularly, this invention pertains to a method of removing and replacing the handle of a motorcycle stand. It allows the handle to be removed and replaced easily using only one hand and no tools.

A motorcycle stand is used for raising the rear wheel of a motorcycle off the ground for maintenance. Motorcycle stands are available to lift the rear of the motorcycle or the front of a motorcycle. The motorcycle stand generally uses leverage to raise the motorcycle off the ground whereby the motorcycle is raised by exerting a downward force on the handle. Generally, the longer the handle the easier it is to lift the motorcycle. When the motorcycle is resting atop a motorcycle stand, the handle normally protrudes past the rear of the motorcycle, or in the case of the front stand, the front of the motorcycle. The long handle presents a tripping hazard and therefore removing the handle after the motorcycle is resting atop the motorcycle stand reduces the trip hazard and generally makes the motorcycle and stand combination occupy less floor space. An added benefit to removing the handle is that it makes the motorcycle stand smaller for shipping and storage.

Often the motorcycle stand also includes a storage location for the handle to keep it restrained and tucked out of the way when it is not in the position to allow leverage.

One prior art method for motorcycle stand handle removal/replacement has been used by Pit Bull brand motorcycle stands since 2007. It consisted of a generally cylindrical shaped handle that slid over a generally cylindrical shaped receiver of the motorcycle stand. A spring-loaded plunger lock mated with a hole on the motorcycle stand receiver to lock it into place.

When the handle slid over the receiver on the motorcycle stand, the spring-loaded plunger lock was pulled out by pulling a ring to allow insertion of the handle over the receiver, then the pressure was released from the spring loaded plunger lock that allowed it to mate with a hole in the receiver of the motorcycle stand. This method was effective but generally required two hands to actuate. One hand was used to hold the motorcycle stand handle and slide it into place while the other hand pulled against spring pressure to retract the plunger lock from its locked position. It is thus desirable to have a single-handed lever-actuated lock to remove the motorcycle stand handle.

BRIEF SUMMARY OF THE INVENTION

The present invention is an enhancement to the prior art branded by Pit Bull Motorcycle Stands. It is a mechanical device that allows a plunger lock to be retracted and deployed via a lever that is depressed by one thumb or finger while the handle is being held by the palm and remaining fingers of the hand. The device allows removal and replacement of the handle using only one hand and no tools.

The device allows the handle to be used to leverage the motorcycle off the ground with the motorcycle stand then the handle is easily removed to allow it to be easily installed onto a storage location on the motorcycle stand.

The present invention has potential for widespread applications in that it can be incorporated wherever it is desirable to easily remove and replace a cylindrical or other shaped feature that is slid over a smaller but similarly shaped feature, then locked into place. Other details and advantages of the present invention are apparent in the following description, accompanying drawings and the claims.

BRIEF DESCRIPTION OF THE DRAWINGS

A fuller understanding of the foregoing may be had by reference to the accompanying drawings, wherein:

FIG. 1A is a motorcycle stand with its handle in the leverage position in accordance with one embodiment of the invention;

FIG. 5B shows a motorcycle situated atop a motorcycle stand as in FIG. 1A but the handle has been moved from its position of leverage to a stowed position.

DETAILED DESCRIPTION OF THE INVENTION

Referring now to the Figures, there is shown a motorcycle stand 100 with a handle component 110. The handle component 110 is removable and capable of being used in multiple locations as provided by the motorcycle stand 100. The present invention is a new device incorporated into motorcycle stands. It is an upgrade to a system in use and configured under the brand Pit Bull and in use since 2007 and described in this paragraph. Though not limited to a cylindrical shape, the handle component 110 slides over a primary receiver post 120 on the motorcycle stand. The inside diameter of the handle component 110 is generally slightly larger than the outside diameter of the receiver posts. The handle-to-receiver fit is close enough to allow them to be relatively co-linear. The handle and stand combination provide an adequate lever for raising a motorcycle off the ground.

There is also secondary receiver post 130 in a generally out-of-the-way location on the forward part of the motorcycle stand 100 that acts as a receiver for the handle component 110 so that it can be stowed. With a handle in the storage location, there is less trip hazard behind the motorcycle when the motorcycle is up on the stand. Also, with the handle in the stowed position the motorcycle stand is smaller and more compact for shipping and/or storage.

Figure 1B:
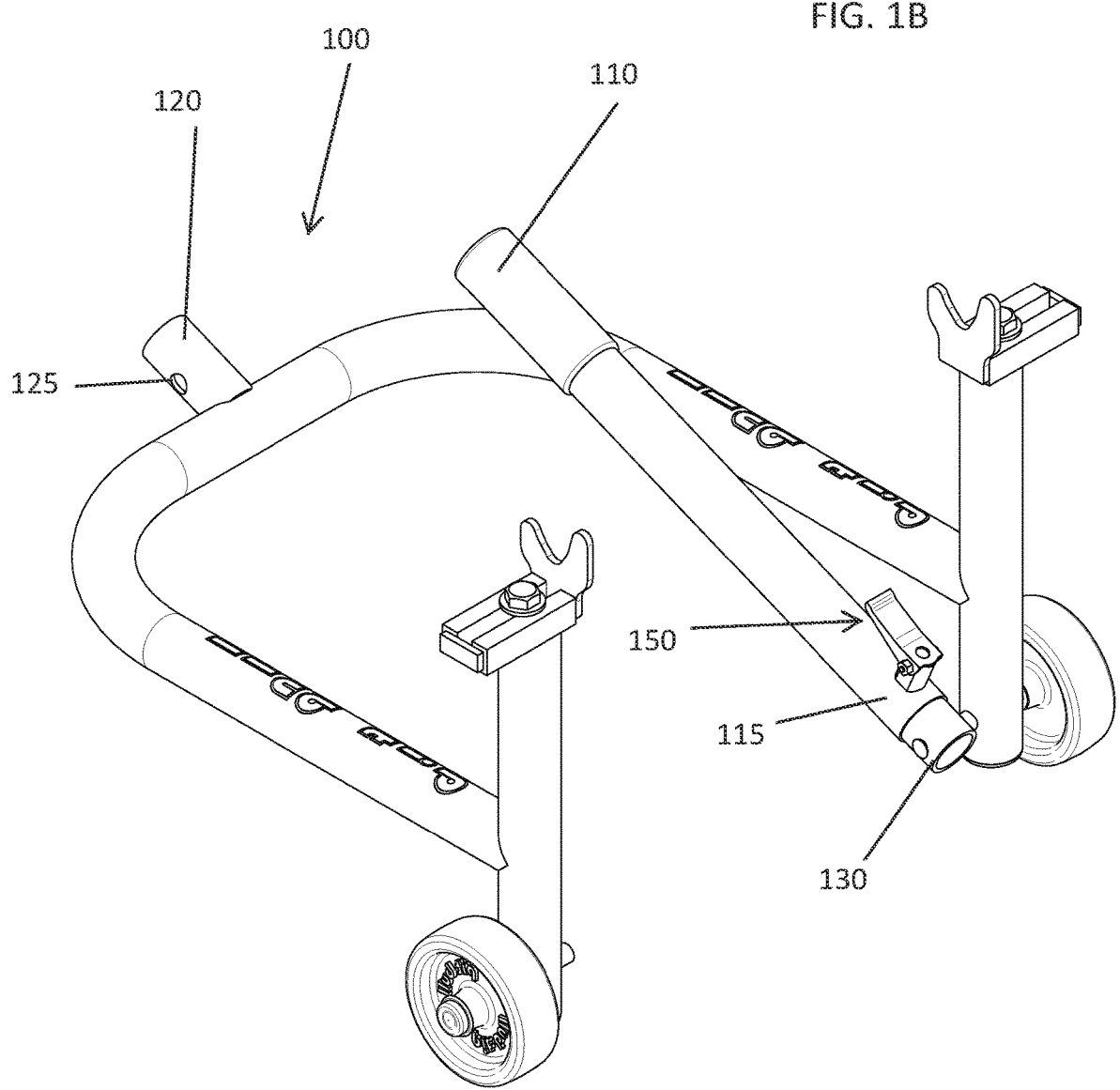
FIG. 1B is a motorcycle stand with its handle in the stowed position in accordance with one embodiment of the invention.
Figure 2:
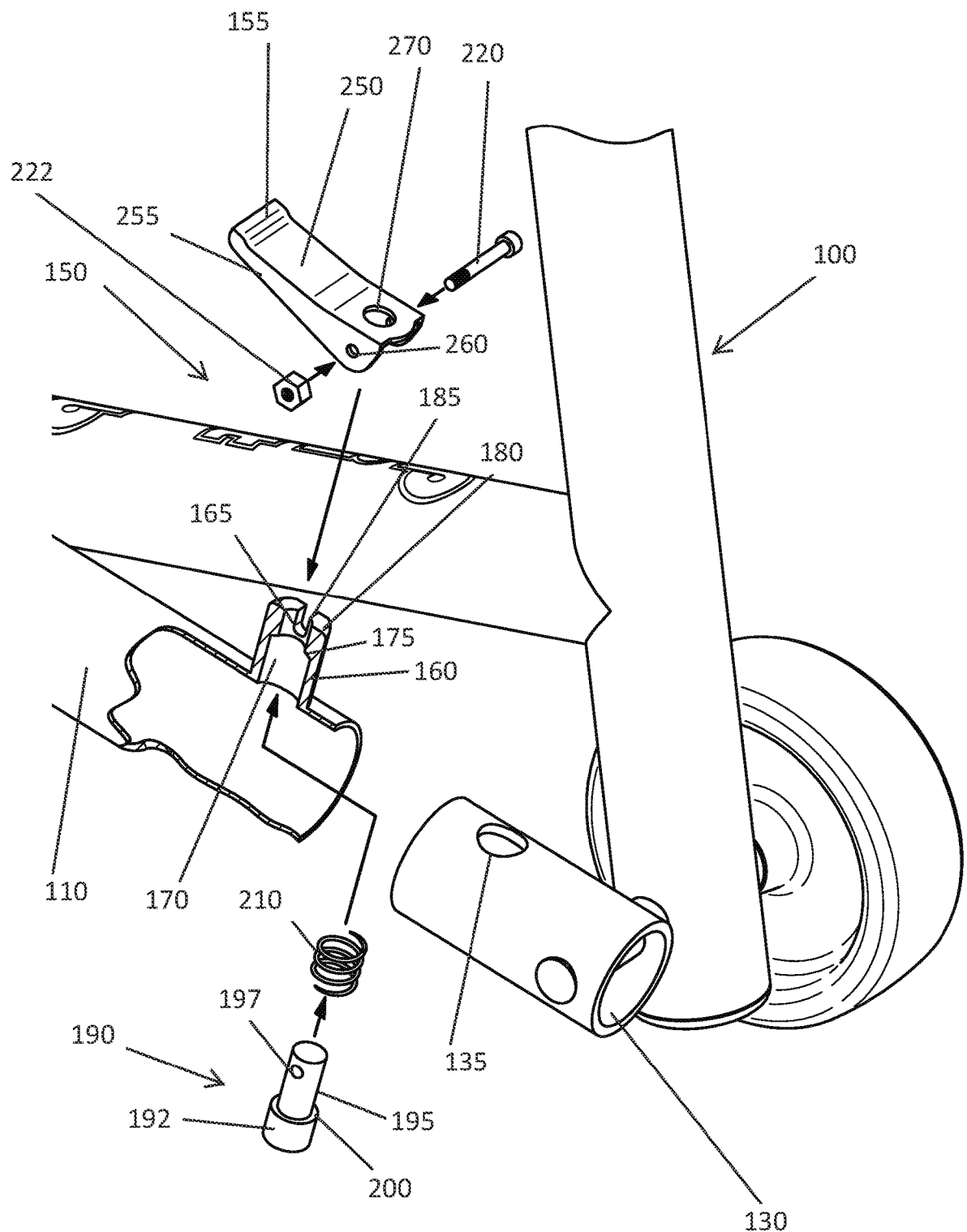
FIG. 2 is an exploded view showing the parts that comprise the lever-actuated lock with respect for its attachment to a motorcycle stand.
Figure 3A:
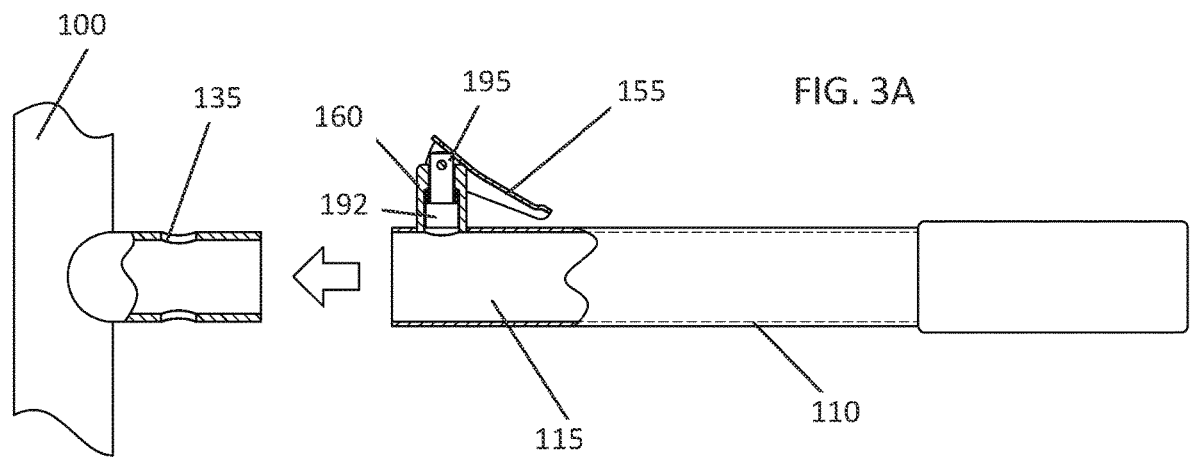
FIG. 3A is a cutaway view showing a handle separated from the receiver of the motorcycle stand that would be in the leverage or stowed location.
Figure 3B:
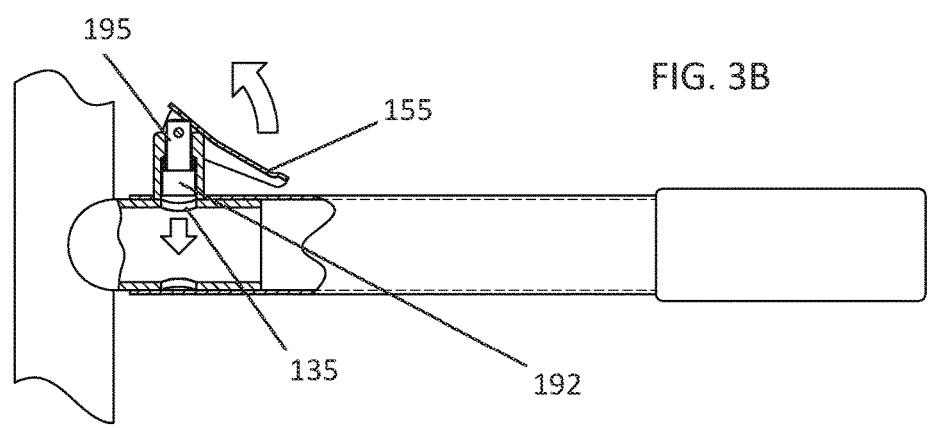
FIG. 3B is a cutaway view showing a handle inserted over a receiver but with the actuator lever depressed and plunger lock recessed away from the receiver.
Figure 3C:
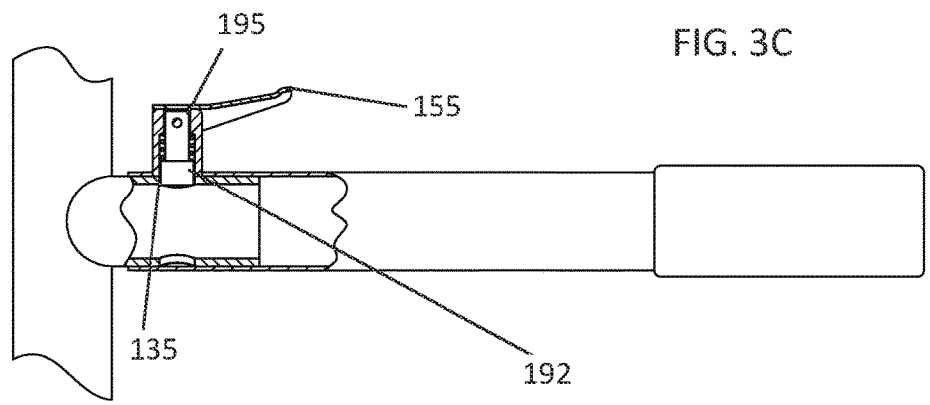
FIG. 3C is a cutaway view showing a handle installed onto a motorcycle stand in either the leverage or stowed position with the plunger lock penetrating the receiver to lock the handle into place.
Figure 4:
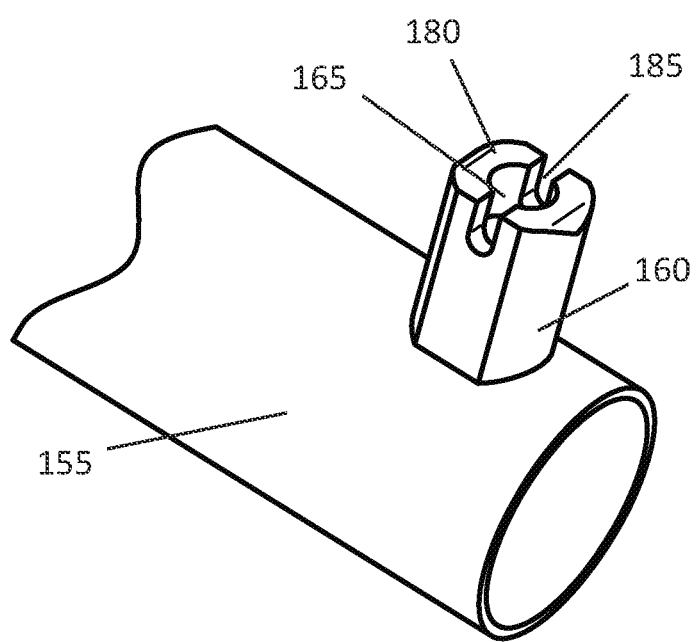
FIG. 4 is a detail of the end of the handle showing the plunger lock housing.

The improvement in the current invention is directed to a lever release mechanism 150 such as the spring-loaded plunger lock shown and incorporated into an end 115 of the handle 110. It mates with a hole 125/135 in the receiver post 120/130 (respectively) on the stand 100 in both the leverage position (FIG. 1A) and a stowed position (FIG. 1B).

There was previously a loop or ring on the end of a plunger that allowed the user to pull the plunger against spring pressure to allow the handle to de-mate from the receiver. Unfortunately, this system required the use of two hands to actuate the plunger lock. One hand was required to hold the handle while the other one pulled the ring to force the plunger to retract.

The improved invention allows the user to lock and unlock the handle 110 from its receiver using only one hand. Instead of using a ring to force the spring-loaded plunger to retract from its locking hole, the user depresses a lever 155 with a thumb while holding the handle 110 with the palm of the hand and the remaining fingers. Alternately, this can be done using other combinations of fingers such as depressing the lever with a forefinger and gripping the handle with a combination of thumb, palm and the remaining fingers.

The lever release mechanism 150 (spring-loaded plunger lock) is defined along the tube end 115, which then slides over a receiver post. When the handle is in place, it can actively be used as leverage force into the stand through the receiver post to lift the motorcycle off the surface for maintenance such as the removal of the axle and wheel.

The tube end 115 has a plunger lock housing 160 attached perpendicularly to the tube end 115. The plunger lock housing 160 includes a bore opening 165 through the top portion and into a large internal cylindrical cavity 170. An internal shoulder section 175 transitions the smaller bore opening 165 to the larger internal cylindrical cavity 170. A channel 185 is defined along the top portion 180 of the plunger lock housing 160 and provides a transition into the bore opening 165. The larger internal cylindrical cavity 170 opens into the cylindrical inside diameter of the handle 110 and the smaller bore opening 165 is open to the end of the plunger lock housing 160 distal to the inside of handle.

A plunger lock 190 is provided with a plunger base 192 and a plunger pin 195. A spring 210 is placed around the plunger pin 195 and positioned in the larger internal cylindrical cavity 170 via the inside of the handle. The plunger pin 195 has a relatively small diameter that corresponds to the smaller bore opening 165 in the plunger lock housing 160 and a relatively large diameter plunger base 192 that corresponds to the relatively large cylindrical cavity 170 in the bottom of the housing 160. Like the housing, the transition from larger plunger base 192 to the smaller plunger pin 195 forms a plunger shoulder 200 that acts as a movement stop against the internal shoulder 175 of the plunger lock housing 160.

Both the smaller diameter and larger diameter of the plunger lock are slightly smaller than the corresponding cylindrical holes in the plunger lock housing to allow free movement up and down while keeping the plunger and housing generally co-linear.

The spring 210 surrounds the plunger pin 195 and is held in place by the shoulder 200 of the plunger lock and is retained on the top by the shoulder 175 inside the plunger lock housing. The spring 210 is allowed to move freely around the plunger lock and inside the plunger lock housing because: a) the inner diameter of the spring is slightly larger than the smaller diameter of the plunger lock and its outer diameter is slightly smaller than the larger diameter of the opening in the plunger lock housing. The plunger lock has a transverse hole 197 through the plunger pin 195 near the top.

The lever 155 can be defined as having a lever base 250 with side flanges 255 extending downwardly from the lever base 250. Each of the side flanges 255 includes an opening 260 defined to align with each other. The lever base 250 includes an end 265 with an aperture 270 positioned transverse to the side flange 225 openings 260.

A screw 220 passes through the aligned openings 260 defined on the level 155, passes the channel 185 of the plunger lock housing 160 and through the transverse hole 197 of the plunger lock 190 thereby retaining the plunger lock to the lever. A nut 222 is secured on the screw to retain it. With the screw installed, the plunger is retained in the housing with the plunger pin being allowed head space into the aperture 270 of the lever base 250.

The plunger/spring combination are prevented from upwardly de-mating from the housing via corresponding shoulders of the housing and the plunger and from downwardly de-mating via the transverse mounted screw through the housing and plunger. In summary regarding the screw, its purpose is to serve as 1) a pivot for the lever, 2) a guide for the plunger lock when used in conjunction with the slots in the plunger lock housing and 3) to retain the plunger lock while still allowing its limited travel. In place of a screw and nut, a clevis pin or any other similar shape with means to prevent retraction could be used.

When the user presses down on the lever 155, the lever is in communication with the plunger lock housing 160 that contains the plunger lock 165 and pulls upward on a pivot pin 170 that passes through a pivot bore on the end of the lever and the plunger. Pressing down on the lever therefore pulls the plunger upward against the force of the spring. Releasing force from the lever allows the plunger lock to go back into its locked position using the force of the spring.

Figure 5A:
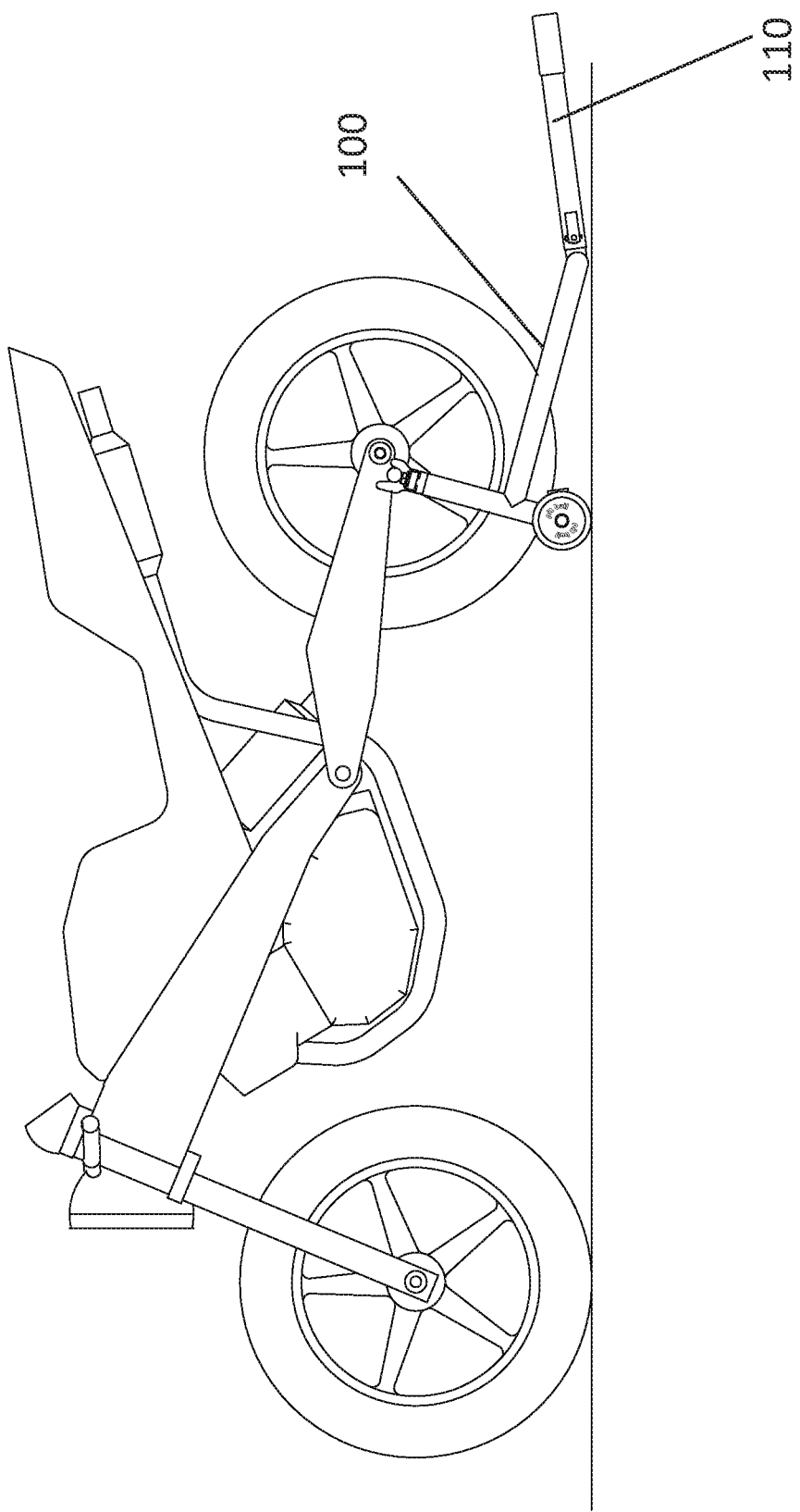
FIG. 5A shows a motorcycle situated atop a motorcycle stand with its rear wheel off the ground. The handle is shown in the position on the motorcycle stand to provide leverage.

Referring to FIG. 5, there is a slot on each side of the plunger lock housing that has two purposes: 1) it allows limited up and down travel of the plunger lock by allowing the transverse screw or pin to ride up and down as force is applied from the lever; and 2) it prevents rotational movement of the lever. Flats on each side of the plunger lock housing that correspond with flat surfaces inside the lever redundantly aid in preventing rotation of the lever.

The lever is the key to operating the invention. By exerting a downward force on the distal end with thumb or other appendage, it makes pressure on the top edge of the plunger lock housing and thereby pulls upward on the screw and plunger lock. The edge of the plunger lock housing has a curved surface to allow the lever to move smoothly as it exerts upward force on the screw and plunger lock. When force is released from the lever, the spring forces the plunger lock to move downward with respect to the plunger lock housing and allows it to lock into place in the receiver. The lever is shaped to comfortably allow the user's thumb to depress it and incorporates a ridge on the distal end to prevent the thumb from slipping off the end.

The handle locks to the receiver by virtue of the fact that the plunger lock protrudes through the plunger lock housing into the inside diameter of the handle and into a hole in the receiver. When the lever is depressed and the plunger lock is thereby retracted, the plunger lock moves out of the hole in the receiver to the extent that it is recessed into the handle and plunger lock housing and out of the inside diameter of the handle. With the plunger lock recessed out of the inside diameter of the handle, the handle can be slid off the receiver.

I claim:

1. A system comprising:
a motorcycle stand comprising a removable handle component configured to attach to a primary receiver post extending outwardly away from a U-shaped stand frame such that when the removable handle component is secured to the primary receiver post the motorcycle stand is configured to lift an end of a motorcycle off a surface for removal of a motorcycle axle and/or a wheel therefrom;
a lever release mechanism positioned on an end of the removable handle component and configured for a single handed release by a user, the lever release mechanism having a locking configuration configured to secure the removable handle component to the primary receiver post and having an unlocking configuration configured to allow for the removable of the removable handle component from the primary receiver post; and
wherein the lever release mechanism includes:
a spring-loaded plunger lock configured to mate with an opening defined on the primary receiver post;
a lever having a pair of side flanges extending downwardly to create a gap therebetween and each of the side flanges having an opening aligned with each other and the lever having an aperture positioned transverse to the side flanges;
a plunger lock housing extending away from the end of the removable handle component, the plunger lock housing having: (a) a bore through a top portion of the plunger lock housing, (b) an internal cylindrical cavity in communication with and defined as being larger than the bore, the internal cylindrical cavity being opened into an inside cavity of the removable handle component (c) an internal shoulder section transitioning between the bore and the internal cylindrical cavity, and (d) a channel slot defined along the top portion of the plunger lock housing;
the plunger lock defined by having a plunger base and a plunger pin, wherein the plunger base has a larger diameter than the plunger pin to define a plunger shoulder transitioning between the plunger base and the plunger pin, and the plunger pin having a transverse hole;
a spring being placed around the plunger pin, and wherein the plunger lock being inserted into the plunger lock housing such that the plunger pin extends through the bore into the channel slot and into the aperture of the lever between the pair of side flanges; and
a screw positioned to secure through the aligned openings on the pair of side flanges and through the transverse hole on the plunger pin to secure the plunger pin in the channel slot with the spring biased in compression between the plunger shoulder and the internal shoulder section of the plunger lock housing, whereby pressing the lever downwardly raises the plunger base into the internal cylindrical cavity and out of the inside cavity of the removable handle component.

2. The system of claim 1, wherein the plunger lock housing extends perpendicularly away from the end of the removable handle.

3. A system comprising:
a motorcycle stand comprising a removable handle component configured to attach to a primary receiver post extending outwardly away from a U-shaped stand frame such that when the removable handle component is secured to the primary receiver post the motorcycle stand is configured to lift an end of a motorcycle off a surface for removal of a motorcycle axle and/or a wheel therefrom;
a lever release mechanism positioned on an end of the removable handle component and configured for a single handed release by a user, the lever release mechanism having a locking configuration configured to secure the removable handle component to the primary receiver post and having an unlocking configuration configured to allow for the removable of the removable handle component from the primary receiver post;
a secondary receiver post positioned inwardly towards the U-shaped stand frame such that when the removable handle component is secured to the secondary receiver post the removable handle component is in a stowed configuration; and
a lever having a pair of side flanges extending downwardly to create a gap therebetween and each of the side flanges having an opening aligned with each other and the lever having an aperture positioned transverse to the side flanges;
a plunger lock housing extending perpendicularly away from the end of the removable handle component, the plunger lock housing having: (a) a bore through a top portion of the plunger lock housing, (b) an internal cylindrical cavity in communication with and defined as being larger than the bore, the internal cylindrical cavity being opened into an inside cavity of the removable handle component (c) an internal shoulder section transitioning between the bore and the internal cylindrical cavity, and (d) a channel slot defined along the top portion of the plunger lock housing;
the plunger lock defined by having a plunger base and a plunger pin, wherein the plunger base has a larger diameter than the plunger pin to define a plunger shoulder transitioning between the plunger base and the plunger pin, and the plunger pin having a transverse hole;
a spring being placed around the plunger pin, and wherein the plunger lock being inserted into the plunger lock housing such that the plunger pin extends through the bore into the channel slot and into the aperture of the lever between the pair of side flanges; and
a screw positioned to secure through the aligned openings on the pair of side flanges and through the transverse hole on the plunger pin to secure the plunger pin in the channel slot with the spring biased in compression between the plunger shoulder and the internal shoulder section of the plunger lock housing, whereby pressing the lever downwardly raises the plunger base into the internal cylindrical cavity and out of the inside cavity of the removable handle component.

4. A system comprising:
a motorcycle stand comprising a removable handle component configured to attach to a primary receiver post extending outwardly away from a U-shaped stand frame such that when the removable handle component is secured to the primary receiver post the motorcycle stand is configured to lift an end of a motorcycle off a surface for removal of a motorcycle axle and/or a wheel therefrom;
a lever release mechanism positioned on an end of the removable handle component and configured for a single handed release by a user, the lever release mechanism having a locking configuration configured to secure the removable handle component to the primary receiver post and having an unlocking configuration configured to allow for the removal of the removable handle component from the primary receiver post, and wherein the lever release mechanism includes a spring-loaded plunger lock configured to mate with a primary opening defined on the primary receiver post; and a secondary receiver post positioned inwardly towards the U-shaped stand frame such that when the removable handle component is secured to the secondary receiver post the removable handle component is in a stowed configuration, and wherein the lever release mechanism including the spring-loaded plunger lock is further configured to mate with a secondary opening defined on the primary receiver post.

5. A system comprising:

a motorcycle stand comprising a removable handle component configured to attach to a primary receiver post extending outwardly away from a U-shaped stand frame such that when the removable handle component is secured to the primary receiver post the motorcycle stand is configured to lift an end of a motorcycle off a surface for removal of a motorcycle axle and/or a wheel therefrom;

a lever release mechanism positioned on an end of the removable handle component and configured for a single handed release by a user, the lever release mechanism having a locking configuration configured to secure the removable handle component to the primary receiver post and having an unlocking configuration configured to allow for the removable of the removable handle component from the primary receiver post, and wherein the lever release mechanism includes a spring-loaded plunger lock configured to mate with a primary opening defined on the primary receiver post; and wherein the lever release mechanism includes:

a lever having a pair of side flanges extending downwardly to create a gap therebetween and each of the side flanges having an opening aligned with each other and the lever having an aperture positioned transverse to the side flanges;

a plunger lock housing extending perpendicularly away from the end of the removable handle component, the plunger lock housing having: (a) a bore through a top portion of the plunger lock housing, (b) an internal cylindrical cavity in communication with and defined as being larger than the bore, the internal cylindrical cavity being opened into an inside cavity of the removable handle component (c) an internal shoulder section transitioning between the bore and the internal cylindrical cavity, and (d) a channel slot defined along the top portion of the plunger lock housing;

the plunger lock defined by having a plunger base and a plunger pin, wherein the plunger base has a larger diameter than the plunger pin to define a plunger shoulder transitioning between the plunger base and the plunger pin, and the plunger pin having a transverse hole;

a spring being placed around the plunger pin, and wherein the plunger lock being inserted into the plunger lock housing such that the plunger pin extends through the bore into the channel slot and into the aperture of the lever between the pair of side flanges; and a screw positioned to secure through the aligned openings on the pair of side flanges and through the transverse hole on the plunger pin to secure the plunger pin in the channel slot with the spring biased in compression between the plunger shoulder and the internal shoulder section of the plunger lock housing, whereby pressing the lever downwardly raises the plunger base into the internal cylindrical cavity and out of the inside cavity of the removable handle component.

6. The system of claim 5 further comprising: a secondary receiver post positioned inwardly towards the U-shaped stand frame such that when the removable handle component is secured to the secondary receiver post the removable handle component is in a stowed configuration, and wherein the lever release mechanism including the spring-loaded plunger lock is further configured to mate with a secondary opening defined on the primary receiver post.

* * * * *